US008924401B2

(12) United States Patent
Raj et al.

(10) Patent No.: US 8,924,401 B2
(45) Date of Patent: Dec. 30, 2014

(54) METHOD AND SYSTEM FOR LOGICAL DATA MASKING

(75) Inventors: Kolandaiswamy Antony Arokia Durai Raj, Tamil Nadu (IN); Balasubramanian Kanagasabapathi, Tamil Nadu (IN)

(73) Assignee: Infosys Limited, Bangalore, Karnataka (IN)

( * ) Notice: Subject to any disclaimer, the term of this patent is extended or adjusted under 35 U.S.C. 154(b) by 613 days.

(21) Appl. No.: 12/814,573

(22) Filed: Jun. 14, 2010

(65) Prior Publication Data

US 2011/0270837 A1   Nov. 3, 2011

(30) Foreign Application Priority Data

Apr. 30, 2010   (IN) .......................... 1213/CHE/2010

(51) Int. Cl.
| | | |
|---|---|---|
| G06F 17/30 | (2006.01) | |
| H04L 9/08 | (2006.01) | |
| G06F 21/62 | (2013.01) | |
| G06F 7/76 | (2006.01) | |

(52) U.S. Cl.
CPC ........ *G06F 21/6227* (2013.01); *G06F 21/6245* (2013.01); *H04L 9/0894* (2013.01); *G06F 7/764* (2013.01); *G06F 7/768* (2013.01); *G06F 21/6254* (2013.01)
USPC .......................................... 707/757; 707/783

(58) Field of Classification Search
CPC   G06F 7/764; G06F 17/30926; G06F 21/6254
USPC ......................................... 707/737, 757, 783
See application file for complete search history.

(56) References Cited

U.S. PATENT DOCUMENTS

| | | | | |
|---|---|---|---|---|
| 6,145,077 | A | * | 11/2000 | Sidwell et al. ................ 712/300 |
| 7,200,757 | B1 | * | 4/2007 | Muralidhar et al. .......... 713/189 |
| 8,422,668 | B1 | * | 4/2013 | Thichina .......................... 380/28 |
| 8,707,058 | B1 | * | 4/2014 | Bain ............................. 713/193 |
| 2004/0019875 | A1 | * | 1/2004 | Welch ........................... 717/109 |
| 2007/0110224 | A1 | * | 5/2007 | Gumpel et al. .................. 380/28 |
| 2007/0130106 | A1 | * | 6/2007 | Gadiraju ........................... 707/2 |
| 2008/0133934 | A1 | * | 6/2008 | Gopinath et al. ............. 713/189 |
| 2009/0195370 | A1 | * | 8/2009 | Huffman et al. ......... 340/426.13 |
| 2009/0204631 | A1 | * | 8/2009 | Pomroy et al. ................ 707/102 |
| 2010/0169262 | A1 | * | 7/2010 | Kenedy et al. .................. 706/50 |

OTHER PUBLICATIONS

Muralidhar et al. "Generating Sufficiency-based Non-Synthetic Perturbed Data", 2008, Transactions on Data Privacy 1.*

(Continued)

*Primary Examiner* — Christyann Pulliam
*Assistant Examiner* — Sheryl Holland
(74) *Attorney, Agent, or Firm* — Michael Best & Friedrich LLP (57) ABSTRACT

A system and method for logically masking data by implementing masking algorithms is provided. The method includes receiving one or more inputs from user regarding type of data masking to be implemented depending on type of data entry. Data entries include alphabetical data, data comprising unique codes, data comprising dates and numerical data. Based on inputs received, the data entries are classified and appropriate masking algorithms are executed. For masking numerical data entries, the data entries are first grouped using clustering algorithms and are then shuffled using shuffling algorithms. For low level of data masking selected by a user, numerical data entries are shuffled within groups and for high level of data masking selected by a user, numerical data entries are shuffled across groups.

14 Claims, 4 Drawing Sheets

(56) References Cited

OTHER PUBLICATIONS

H. Stone, "Parallel Processing with the Perfect Shuffle", 1970, IEEE.*

Jeong et al., "A Unified Fast Recursive Algorithm for Data Shuffling in Various Orders", 1992, IEEE Transactions on Signal Processing, vol. 40, No. 5, May 1992.*

* cited by examiner

METHOD AND SYSTEM FOR LOGICAL DATA MASKING

FIELD OF INVENTION

The present invention relates generally to the field of data masking. More particularly, the present invention implements a data masking algorithm for logically masking data using clustering techniques.

BACKGROUND OF THE INVENTION

Due to rapid growth in the field of information technology in last two decades, various organizations are under obligation, owing to business as well as regulatory needs, to store huge volumes of data. Organizations required to store such huge volumes of data include organizations in fields such as banking, insurance, defense, health care etc. Generally, the practice of organizations is to store data in a server database.

As a result of plethora of information available on the Internet and multiple tools available to access information remotely, data and information security is of prime concern to businesses that store sensitive data such as customer's personal information. Examples of personal information include information relating to customer's banking transactions, personal information of a customer such as name, address, customer profile data, medical history of patients stored in a hospital database, classified information in defense etc. Such information if accessed by an unauthorized user can be extremely damaging to financial as well as personal security of a customer. Hence, it is necessary for an organization to preserve sensitive information from unauthorized users. Even in the event of unauthorized access of sensitive information, an organization should endeavor not to reveal any customer information.

Customer information can be secured by masking data so that sensitive information about a customer is not disclosed. Various methods for data masking include, but are not limited to, nulling out, character masking, substitution, shuffling, number variance, gibberish generation and encryption. The aforesaid methods suffer from various limitations. For example, nulling out replaces all records with null values; hence it is difficult to design test cases resulting in poor approximated data for computation. Character masking is complex if the data entry has special cases and may leave some data entries inappropriately masked. Further, substitution requires lot of stored data sets and preliminary efforts and shuffling requires an effective randomized shuffling algorithm which is ineffective in processing small data sets. Limitations of other methods include, number variance technique can be applied only on entries with numbers, gibberish generation employs a substitution method which is complex, whereas security of encrypted data is dependent on strength of encryption used.

In the light of the above, there exists a need to devise a method of masking numerical as well as alphabetical data. Further, masked data should minimize the possibility of having same entry and close entries even after random shuffling.

SUMMARY OF THE INVENTION

A method and system for implementing logical data masking on data stored in a database is provided. In various embodiments of the present invention, data stored in a database may include organizational data stored in the form of tables having one or more entries. The method for implementing logical data masking includes loading data to be masked from database. The method further includes receiving one or more inputs from user regarding type of data masking to be implemented for particular entries. The one or more inputs include level of data masking to be implemented. Based on the one or more inputs, the one or more entries are classified and thereafter one or more algorithms for masking alphabetical data, data comprising unique codes, and data comprising dates and numerical data are executed. For the purpose of masking numerical data, entries corresponding to the numerical data are grouped using clustering algorithms and then are shuffled using shuffling algorithms.

In various embodiments of the present invention, string masking algorithms are implemented for masking alphabetical data. The string masking algorithms include rank-based shuffling algorithms and position-based shuffling algorithms. In an embodiment of the present invention, clustering algorithms for grouping numerical data include hierarchical clustering algorithm, partition clustering algorithm and density-based clustering algorithm. The clustering algorithms are implemented by determining similarity of entries to be grouped together by measuring at least one of Euclidean distance, Manhattan distance, Maximum Norm, Mahalanobis distance and Hamming distance.

In various embodiments of the present invention, entries corresponding to numerical data are grouped using clustering algorithms and then are shuffled using shuffling algorithms. For a low level of data masking selected by a user, numerical data entries are shuffled within groups. Alternatively, for a high level of data masking selected by a user, numerical data entries are shuffled across groups.

In an embodiment of the present invention, for implementing logical data masking on data stored in a database, string masking algorithm is executed for masking alphabetical data, unique code masking algorithm is executed for masking data comprising unique codes and date masking algorithm is executed for masking data comprising dates.

In various embodiments of the present invention, system for implementing logical data masking on data entries stored in a database includes a user interface configured to facilitate provision of one or more inputs by a user. The one or more inputs specify type of masking to be employed for data entries stored in the database and level of data masking to be employed. The system further includes an analytical engine operationally connected to the database and configured to host one or more data masking algorithm modules comprising software code for masking data entries. The software code for masking data entries is executed based on the one or more inputs provided by the user.

In an embodiment of the present invention, the one or more data masking algorithm modules are configured to execute at least one of shuffling algorithms, string masking algorithms, date masking algorithm, unique code masking algorithm and clustering algorithms.

In an embodiment of the present invention, the random number generator module comprises at least one of linear congruential generator, lagged Fibonacci generator and one or more generalized feedback shift registers.

In an embodiment of the present invention, the system for implementing logical data masking on data entries stored in a database includes a server hosting a database comprising one or more data entries and an analytical engine operationally connected to the database and configured to host one or more data masking algorithm modules comprising software code for masking data entries. Further, the system includes one or more clients networked with the server and configured to facilitate provision of one or more inputs by users regarding type of data masking to be implemented for the one or more entries and level of data masking to be used.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
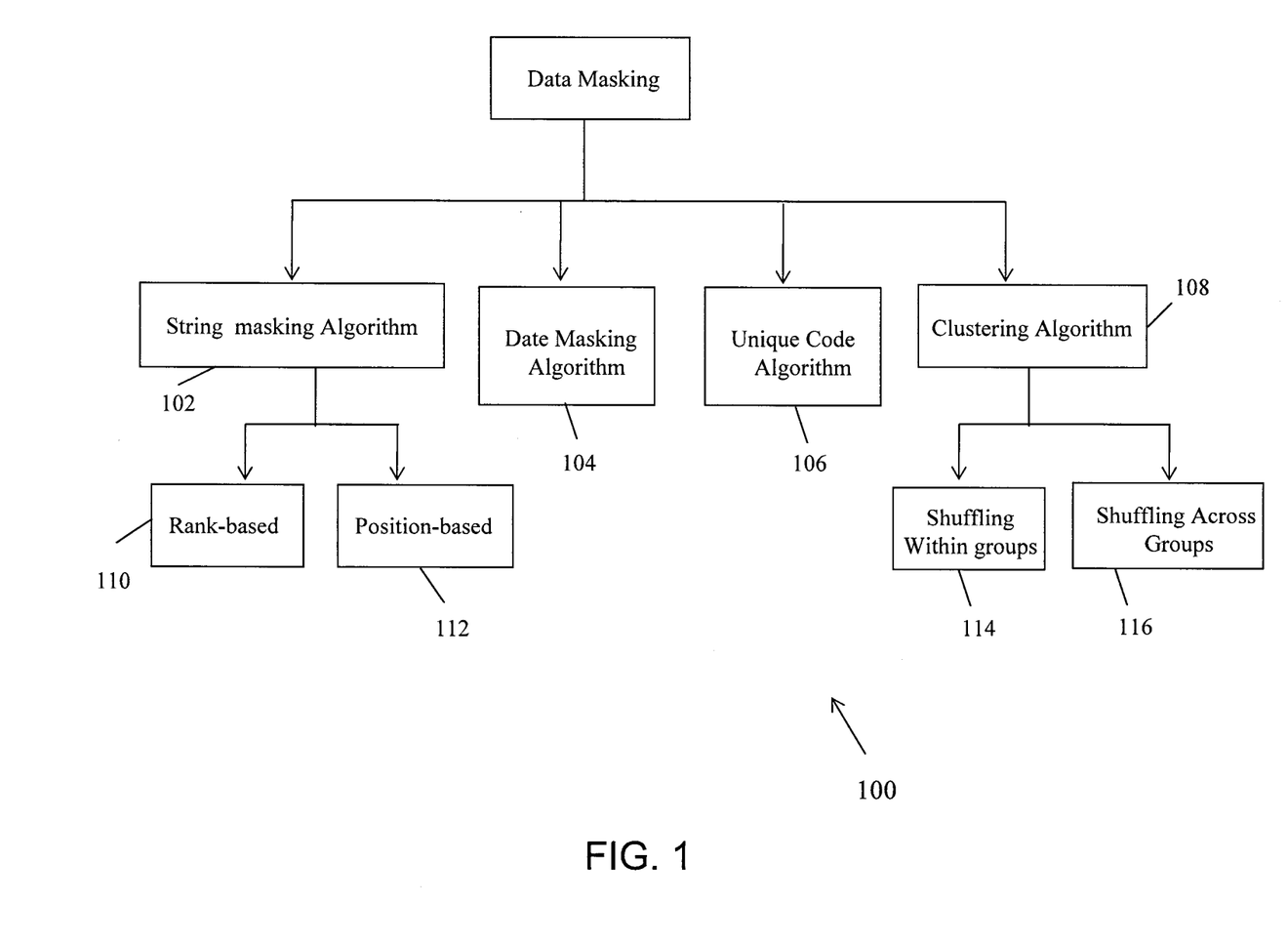
FIG. 1 illustrates a conceptual framework of data masking algorithms used in various embodiments of the present invention.

FIG. 1 shows a conceptual framework of data masking algorithms as used in the present invention. In various embodiments of the present invention, multiple data masking algorithms are used for masking various portions of data. Data used in business applications may include alphabets, numerals, as well as combination of alphabets and numerals. A typical example of business data may include a table comprising multiple entries corresponding to employees of an organization, wherein each entry includes demographic information such as name, age, salary, marital status etc. of each employee. In order to logically mask the data, method and system of the invention uses distinct masking algorithms for distinct columns of each entry. In various embodiments of the present invention, distinct columns of entries are segregated based on user input and then different masking algorithms are applied to the distinct parts. For example, columns such as, "Age" and "Salary" having characteristically similar data are grouped together, since both the columns contain data represented by numerals. Thereafter, a particular data masking algorithm is applied on the aforementioned columns. Further, other columns such as, "Name" and "Address" having characteristically similar data are grouped together and another data masking algorithm is applied on these columns. The approach of using separate masking algorithms for separate columns or groups of columns ensures robust data integrity because any attempts to recover original entries by methods such as random shuffling become less effective.

In an embodiment of the present invention, a class of algorithms used for masking alphabetical data is String masking Algorithm 102. Examples of String masking Algorithm 102 are Rank-based shuffling algorithm 110 and Position-based shuffling algorithm 112. In a Rank-based shuffling algorithm, a rank value is assigned to each alphabet within a word based on a group of generated random numbers and thereafter masking is performed in a logical manner. The following method steps illustrate implementation of rank-based shuffling algorithm:

At step 1, firstly, length of word to be masked is determined. For example, let p represents length of the word. Then, a position number for each alphabet in the word is assigned. Subsequently, at step 2, p random numbers are generated and each alphabet in the word is assigned a rank as per increasing order of the generated random numbers. In an example, let $q_i$ represent rank at $i^{th}$ position in the random sequence. Then, at step 3, alphabet from $i^{th}$ position in the actual word is placed in the $q_i^{th}$ position in order to obtain the masked entry. The activity in step 3 is repeated in until all letters in the word are placed.

The example below illustrates assignment of position to each alphabet as per the rank-based shuffling algorithm:

TABLE 1

Alphabets in a word with corresponding position numbers

| Position number | 1 | 2 | 3 | 4 | 5 | 1 | 2 | 3 | 4 | 5 | 6 |
|---|---|---|---|---|---|---|---|---|---|---|---|
| Alphabets | G | L | E | N | N | M | A | T | H | E | W |

As shown in Table 1 above, each alphabet in the name "GLENN" and the word "MATHEW" is assigned a position number. Since word length of the first name "GLENN" is five, i.e. p=5, hence five uniformly distributed random numbers are generated between [0, 1] corresponding to each alphabet. After the generation of random numbers, ranks are assigned to each alphabet by arranging the random numbers in increasing order. Similarly, for the name "MATHEW", six uniformly distributed random numbers are generated and then ranks are assigned to each alphabet in the word. The tables 2 and 3 below illustrate assignment of ranks for the names "GLENN" and "MATHEW" based on the above description:

TABLE 2

Assignment of ranks for the name "GLENN"

| Random number | 0.83 | 0.66 | 0.64 | 0.02 | 0.41 |
|---|---|---|---|---|---|
| Ranks | 5 | 4 | 3 | 1 | 2 |
| Alphabets | G | L | E | N | N |

TABLE 3

Assignment of ranks for the name "MATHEW"

| Random number | 0.45 | 0.61 | 0.38 | 0.65 | 0.95 | 0.73 |
|---|---|---|---|---|---|---|
| Ranks | 2 | 3 | 1 | 4 | 6 | 5 |
| Alphabets | M | A | T | H | E | W |

After the assignment of ranks for the names, alphabets in corresponding names are reassigned new position numbers in conformance to the ranks to obtain the masked word. For example, in Table 2 above, since the rank of alphabet "G" is 5, alphabet "G" is assigned position number 1 and similarly alphabet "L" is assigned the position number 2. Table 4 below illustrates the masked word corresponding to the name "GLENN" after the reassignment of position numbers based on ranks.

TABLE 4

Masked word corresponding to the name "GLENN"

| Initial Position Numbers | 4 | 5 | 3 | 2 | 1 |
|---|---|---|---|---|---|
| Alphabets | N | N | E | L | G |
| New Position Numbers | 1 | 2 | 3 | 4 | 5 |

Similarly, Table 5 below illustrates the masked word corresponding to the name "MATHEW" after the reassignment of position numbers based on ranks:

TABLE 5

Masked word corresponding to the name "MATHEW"

| Initial Position Numbers | 3 | 1 | 2 | 4 | 6 | 5 |
|---|---|---|---|---|---|---|
| Alphabets | T | M | A | H | W | E |
| New Position Numbers | 1 | 2 | 3 | 4 | 5 | 6 |

In various embodiments of the present invention, in a position-based shuffling algorithm, a position number is assigned to each character of a word to be masked and then random numbers corresponding to number of characters in the word are generated. Thereafter, new position numbers are assigned to the characters based on an increasing sequence of random numbers generated. The following method steps illustrate implementation of position-based shuffling algorithm:

At step 1, firstly, length of word to be masked is determined. For example, let p represents length of the word. Then, a position number for each alphabet in the word is assigned. Subsequently, at step 2, p random numbers are generated and each alphabet in the word is assigned a position. The random numbers are then arranged as per increasing order of the generated random numbers, resulting in a sequence of position numbers ($q_i$). In an example, let $q_i$ represent new position number at $i^{th}$ position in the random sequence. Then, at step 3, alphabet from $i^{th}$ position in the actual word is placed in the $q_i^{th}$ position in order to obtain the masked entry. The activity in step 3 is repeated until all letters in the word are placed. The mechanism of position-based shuffling algorithm is illustrated with an example. See Table 6, Table 7, Table 8, Table 9, Table 10 and Table 11 for more details.

TABLE 6

Assignment of position number for the name "GLENN"

| Position Numbers | 1 | 2 | 3 | 4 | 5 |
|---|---|---|---|---|---|
| Alphabets | G | L | E | N | N |
| Random number | 0.83 | 0.66 | 0.64 | 0.02 | 0.41 |

TABLE 7

Arrangement of position numbers based on the increasing order of random numbers

| Position numbers | 4 | 5 | 3 | 2 | 1 |
|---|---|---|---|---|---|
| Random number | 0.02 | 0.41 | 0.64 | 0.66 | 0.83 |

TABLE 8

Masked word corresponding to the name "GLENN"

| Position numbers | 4 | 5 | 3 | 2 | 1 |
|---|---|---|---|---|---|
| Masked alphabets | N | N | E | G | L |

TABLE 9

Assignment of position number for the name "MATHEW"

| Position Numbers | 1 | 2 | 3 | 4 | 5 | 6 |
|---|---|---|---|---|---|---|
| Alphabets | M | A | T | H | E | W |
| Random number | 0.45 | 0.61 | 0.38 | 0.65 | 0.95 | 0.73 |

TABLE 10

Arrangement of position numbers based on the increasing order of random numbers

| Position Numbers | 3 | 1 | 2 | 4 | 6 | 5 |
|---|---|---|---|---|---|---|
| Random number | 0.38 | 0.45 | 0.61 | 0.65 | 0.73 | 0.95 |

TABLE 11

Masked word corresponding to the name "MATHEW"

| Position numbers | 3 | 1 | 2 | 4 | 6 | 5 |
|---|---|---|---|---|---|---|
| Masked alphabets | A | T | M | H | W | E |

A date masking algorithm 104 is used to mask date values. In an embodiment of the present invention, the date masking algorithm is applied to mask day value in the date and skips other parts of the date. Usually dates may be represented in different formats such as:

1) Day-Month-Year and
2) Month-Day-Year

As shown in the above examples, normally the day part and the year part of the representation is numeral. In an embodiment of the present invention, only the day part of the date is altered in order to mask the real date. For the purpose of altering the day part, it is replaced by a random number generated between (0, 28). The reason for fixing the number 28 as an upper bound is to avoid an existing entry being replaced by an infeasible day. For example, if we consider the date Jun. 5, 2009 and the upper bound is set as 31 days, then there is a possibility of getting a masked date as Jun. 31, 2009 for the month of June, which is infeasible since the month of June has only 30 days. Thus, to overcome the problem of infeasibility, the upper bound for the day is fixed as 28, since the month of February has the minimum number of days i.e. "28 days".

In one of the embodiments of the present invention, the mechanism of the date masking algorithm is illustrated as follows:

For a date to be masked being: May 10, 1979
A random day number is generated using the following equation:

$$DN = 1 + (u_{d_1} \times 27) \qquad (1)$$

where $u_{d_1}$ is uniformly distributed random number between [0,1]. The resulting DN has to be rounded off to the nearest integer.

In an example, consider $u_{d_1}=0.15$, then $DN=1+(0.15\times27)=5.05\sim5$ (rounded off to the nearest integer)

Thus in the date May 10, 1979, the entry 10 is replaced with 5 and the resulting masked date will be May 5, 1979. For any format of the date, only day part of the date representation is altered to obtain the masked date.

Since data used in business applications may include a combination of alphabets and numerals, such as codes. Examples of codes may include alphanumeric codes identifying customers of organizations or banks. A unique code masking algorithm 106 is used for masking data represented by combination of alphabets and numerals. For example, if the unique code to be masked is CS2009, the alphabet part of the unique code is retained, whereas the numeral part (2009) is altered or replaced with a random number. The random number is generated using the following equation:

$$U=1+(u_{uc}\times2009) \qquad (2)$$

where $u_{uc}$ is uniformly distributed random number between [0,1]. The resulting random number is rounded off to the nearest integer.

For example, considering $u_{uc}=0.8$, then
$U=1+(0.8\times2009)=1608.2\sim1608$. After the generation of random number, 2009 is replaced by 1608. The resulting masked unique code is CS1608.

Typically, in various applications, entries corresponding to data to be masked may be in the form of a table including distinct columns having alphabetical or alphanumeric or numerical data. As described herewith, for the purpose of effectively masking strings or alphanumeric data, string masking algorithm 102, date masking algorithm 104 and a unique code algorithm 106 is used. However, for masking numerical entries, in order to implement a robust masking scheme, a clustering algorithm 108 is used. The clustering algorithm 108 refers to an algorithm selected from a class of algorithms effective for grouping data. Numerical entries from a table are grouped together or clustered and are thereafter masked. In an embodiment of the present invention, various clustering algorithms used may include, but are not limited to, hierarchical clustering, partition clustering, density-based clustering etc. The basic concept of a clustering algorithm includes determining similarity of entries to be grouped together. In an example, similarity is measured by measuring Euclidean distance between two points. Other methods for measuring similarity which may be apparent to a person skilled in the art includes distance measures such as Manhattan distance, maximum norm, Mahalanobis distance and Hamming distance. During the course of the clustering process, as part of general practice, the number of clusters is determined by rule of thumb which is equal to $$\sqrt{\frac{n}{2}}$$

or based on goodness of clustering measures. In various embodiments of the present invention, following the completion of the clustering process, each entry is masked by either shuffling or swapping or altering the entry. Shuffling of data is carried out either within groups 114 or across groups 116. The process of shuffling data as part of clustering is described in detail in conjunction with the description of following figures.

Figure 2:
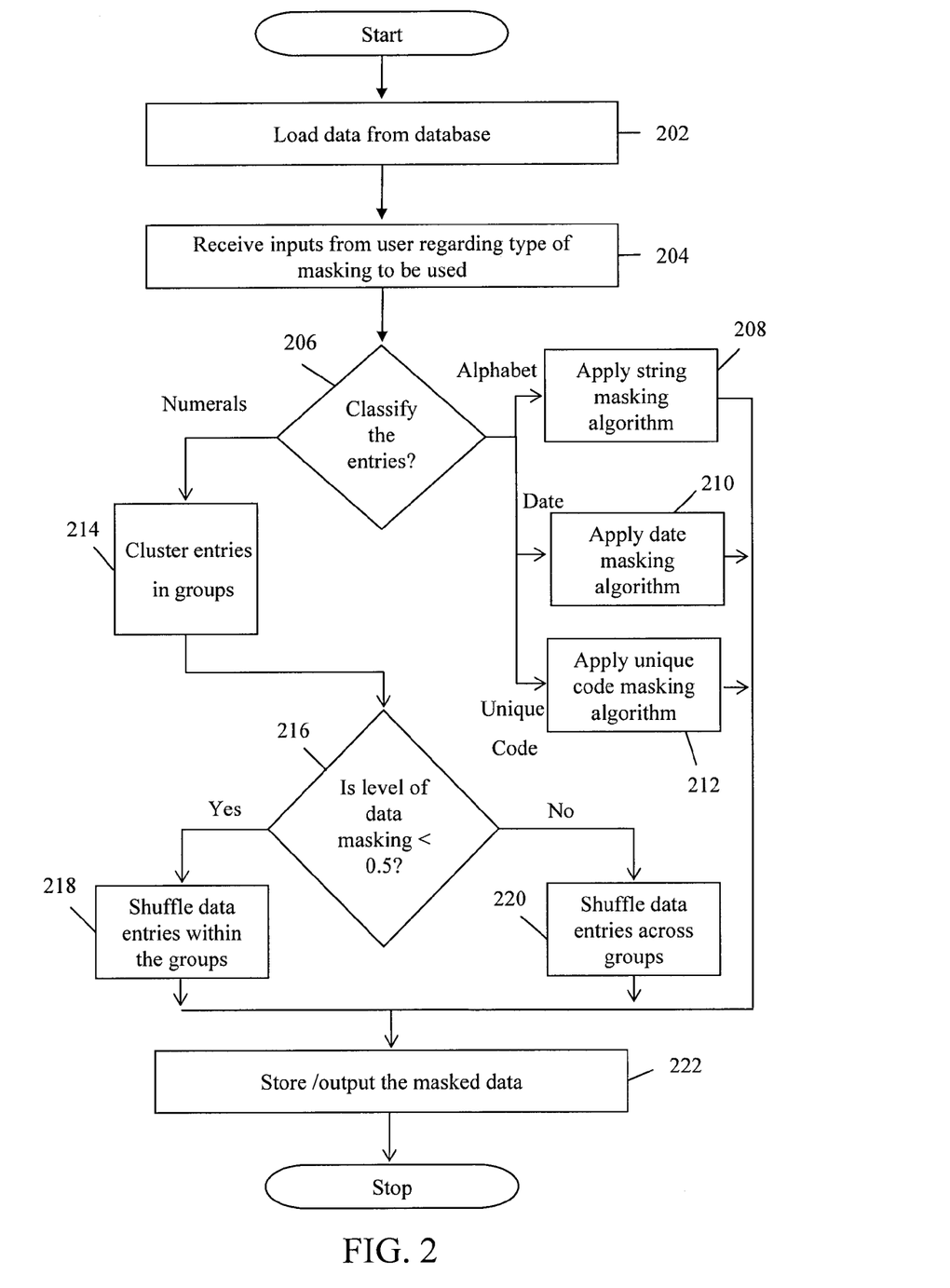
FIG. 2 is a flowchart illustrating method steps used in masking data, in accordance with an embodiment of the present invention.

FIG. 2 is a flowchart showing method steps used in masking data. At step 202, data to be masked is loaded from a database. In an embodiment of the present invention, data to be masked includes a table having multiple columns of entries. Examples of entries for employee data in an organization may include entries in columns specified by "Name", "Address", "Employee Code", "Salary", "Age" etc. Thereafter, at step 204, input is received from a user regarding type of masking to be employed for the entries. In an example, a user may specify a rank-based shuffling type algorithm to be employed for entries in the columns "Name" and "Address" and a unique code masking algorithm to be employed for entries in the column "Employee Code".

Based on inputs received from user regarding type of masking to be used, the entries are classified at step 206. The classification is done by segregating the entries into categories based on type of masking to be performed for each entry. In various embodiments of the present invention, string masking algorithm is applied to columns having alphabetical entries at step 208, date masking algorithm is applied to columns having date entries at step 210 and unique code masking algorithm is applied to columns having alphanumeric entries at step 212. At step 214, entries with numerical values are clustered in groups using clustering algorithms. The clustering of entries within groups is done based on similarity of entries. The example below illustrates clustering of data:

Assuming a base dataset shown in Table 12 below:

TABLE 12

Age and annual income

| Entity no. | Age | Annual income |
|---|---|---|
| 1 | 25 | 12000 |
| 2 | 28 | 10000 |
| 3 | 26 | 13000 |
| 4 | 50 | 50000 |
| 5 | 49 | 55000 |
| 6 | 46 | 49000 |

Table 10 depicts "Age" and "Annual income" numbers for 6 employees. In an embodiment of the present invention, applying clustering algorithm on this data set results in two clusters: Group A and Group B. Let Group A constitutes entities with entity numbers 1, 2 and 3 and Group B constitutes entities with entity numbers 4, 5, and 6. Tables 13 and 14 below illustrate Group A and Group B respectively.

TABLE 13

Group A

| Entity no. | Age | Annual income |
|---|---|---|
| 1 | 25 | 12000 |
| 2 | 28 | 10000 |
| 3 | 26 | 13000 |

TABLE 14

Group B

| Entity no. | Age | Annual income |
|---|---|---|
| 4 | 50 | 50000 |
| 5 | 49 | 55000 |
| 6 | 46 | 49000 |

It is easily apparent that "Group A" consists of entities with lower annual incomes and "Group B" consists of entities with higher annual incomes. Subsequent to the clustering of entries into groups, data masking is performed either within groups or across groups. At step 216, level of data masking to be implemented after the clustering of entries is determined. Preference inputs are received from a user stating the level of data masking to be applied to the clustered entries. Values of preferences for level of data masking that lie between '0' to '1' are obtained from a user through a Graphical User Interface (GUI). If the value preferred by the user is less than 0.5, then the level of masking to be done is low, whereas if the value preferred is more than 0.5, then the level of masking to be done is high. For low level of data masking, at step 218, data entries are shuffled within groups. Shuffling is done by randomly swapping two entries within each column. For example, generate two random numbers between [0,1], say $u_1$ and $u_2$. The generated random numbers are then used to identify the positions of entities to be swapped in each column. The identification is performed using the following equations:

$$\text{Position } 1 = 1 + (u_1 \times (n_1 - 1)) \quad (3)$$

$$\text{Position } 2 = 1 + (u_2 \times (n_1 - 1)) \quad (4)$$

where $u_1$ and $u_2$ are random numbers generated between [0,1], and $n_1 = 3$, since the number of entries in Group A and Group B are 3.

For example, considering the random numbers to be $u_1 = 0.15$ and $u_2 = 0.92$ for the column "Age"

Plugging in the values in equations (3) and (4), we get $$\text{Position } 1 = 1 + (0.15 \times (3-1)) = 1.3 \sim 1 \text{ (rounded off to the nearest integer)}$$

$$\text{Position } 2 = 1 + (0.92 \times (3-1)) = 2.84 \sim 3 \text{ (rounded off to the nearest integer)}$$

Hence, the entry in Position 1 for the column "Age" is swapped with the entry in Position 2, and the resulting Table is illustrated below:

TABLE 15

| Group A | | |
|---|---|---|
| Entity no. | Age | Annual income |
| 1 | 26 | 12000 |
| 2 | 28 | 10000 |
| 3 | 25 | 13000 |

The same process of generating random numbers is repeated for the column "Annual income" and the positions identified are swapped.

In a scenario where it is determined at step 216 that level of data masking selected by a user is greater than 0.5, data entries are shuffled across groups at step 220. In an embodiment of the present invention, shuffling of data entries across groups is done to replace the entry in an entity with a dissimilar entry. Replacing an entry with a dissimilar entry is a stronger level of data masking compared to replacing the entry with an entry from within the group. However, before replacing an entry in a group with an entry from another group, the first column in the group is shuffled within the group using the algorithm described at step 218. This is done to maintain dissimilarity, since swapping entries from other group may result in similar entries in the entities after shuffling across groups also. In an embodiment of the present invention, the following example illustrates shuffling across groups:

TABLE 16

| Group A | | |
|---|---|---|
| Entity no. | Age | Annual income |
| 1 | 25 | 12000 |
| 2 | 28 | 10000 |
| 3 | 26 | 13000 |

TABLE 17

| Group B | | |
|---|---|---|
| Entity no. | Age | Annual income |
| 4 | 50 | 50000 |
| 5 | 49 | 55000 |
| 6 | 46 | 49000 |

For the purpose of shuffling data across groups A and B, the entries in column "Age" in the Groups A and B are shuffled within the group first to obtain the new groups C and D illustrated below:

TABLE 18

| Group C | | |
|---|---|---|
| Entity no. | Age | Annual income |
| 1 | 26 | 12000 |
| 2 | 25 | 10000 |
| 3 | 28 | 13000 |

TABLE 19

| Group D | | |
|---|---|---|
| Entity no. | Age | Annual income |
| 1 | 49 | 50000 |
| 2 | 46 | 55000 |
| 3 | 50 | 49000 |

For shuffling across the Groups C and D, entries in the column "Annual Income" are then swapped for the purpose of shuffling. The positions to be swapped from Groups C and D are determined as follows. Firstly, two random numbers are generated between [0, 1]. Let the random numbers generated are $u_1$ and $u_2$. Subsequent to the generation of random numbers, positions from Group C and Group D are determined for swapping entries. The positions are determined by the following equations:

$$\text{Position in Group } A = 1 + (u_1 \times (n_1 - 1)) \text{ and}$$

$$\text{Position in Group } B = 1 + (u_2 \times (n_2 - 1))$$

In the above example, $n_1 = 3$ and $n_2 = 3$. Now, considering $u_1 = 0.15$ and $u_2 = 0.92$, then $$\text{Position in Group } A = 1 + (0.15 \times (3-1)) = 1.3 \sim 1 \text{ (rounded off to the nearest integer) and}$$

$$\text{Position in Group } B = 1 + (0.92 \times (3-1)) = 2.84 \sim 3 \text{ (rounded off to the nearest integer)}.$$

Thus, Entity 1 from Group C under the annual income column (12000) is swapped with Entity 3 from Group D (49000). The resulting Group C is as follows:

TABLE 20

| Group C | | |
|---|---|---|
| Entity no | Age | Annual income |
| 1 | 26 | 49000 |
| 2 | 25 | 10000 |
| 3 | 28 | 13000 |

For completing the entire shuffling process across Groups C and D, the swapping algorithm described above is applied $n_1$ times for Group C and $n_2$ times for Group D respectively. In the above example, $n_1=3$ and $n_2=3$. In an embodiment of the present invention, after the application of clustering algorithm, if the number of groups obtained are more than two, two groups are selected randomly and then shuffling algorithm is applied across the two groups.

TABLE 21

| Resulting Table after Data Masking | | |
|---|---|---|
| Entity no. | Age | Annual income |
| 1 | 25 | 55000 |
| 2 | 28 | 49000 |
| 3 | 26 | 50000 |
| 4 | 50 | 13000 |
| 5 | 49 | 12000 |
| 6 | 46 | 10000 |

In an embodiment of the present invention, after the shuffling of data entries, at step 222, the masked data is stored in a database. In another embodiment of the present invention, the masked data is output for use by an application.

Figure 3:
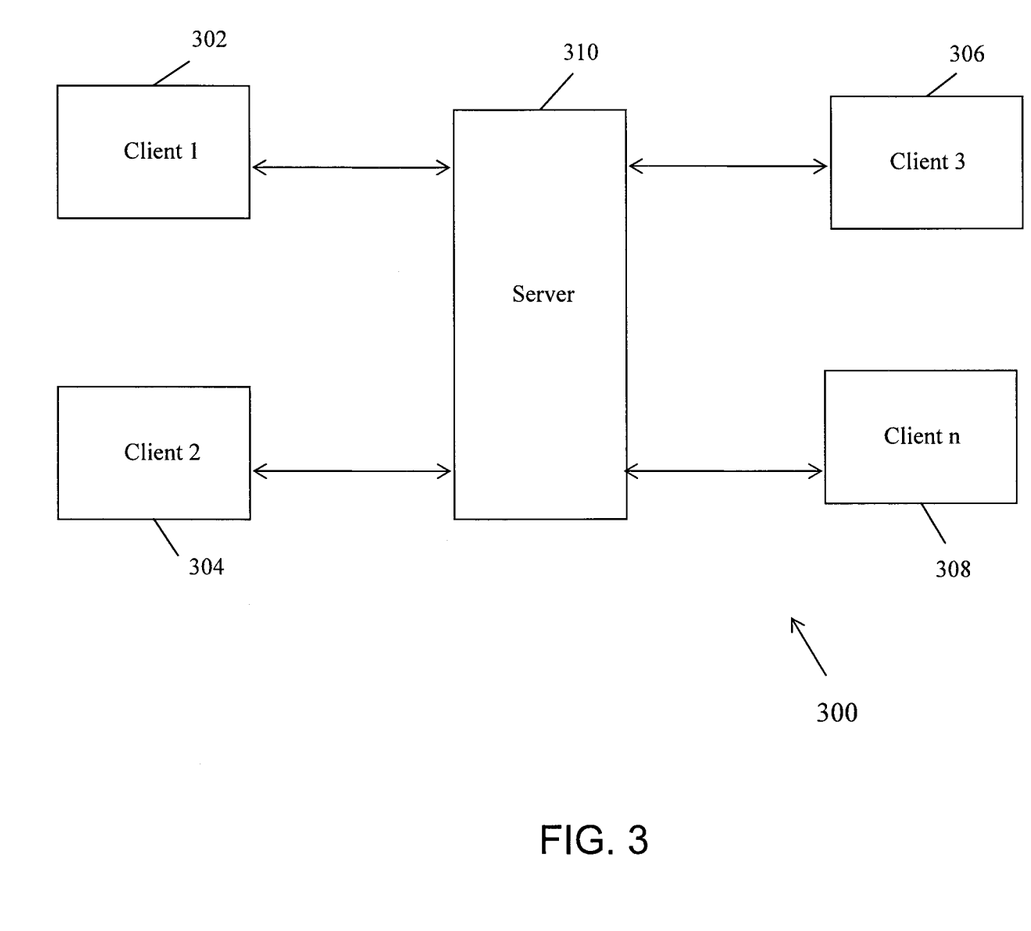
FIGS. 3 and 4 illustrate a system for implementing logical data masking, in accordance with an embodiment of the present invention.
Figure 4:
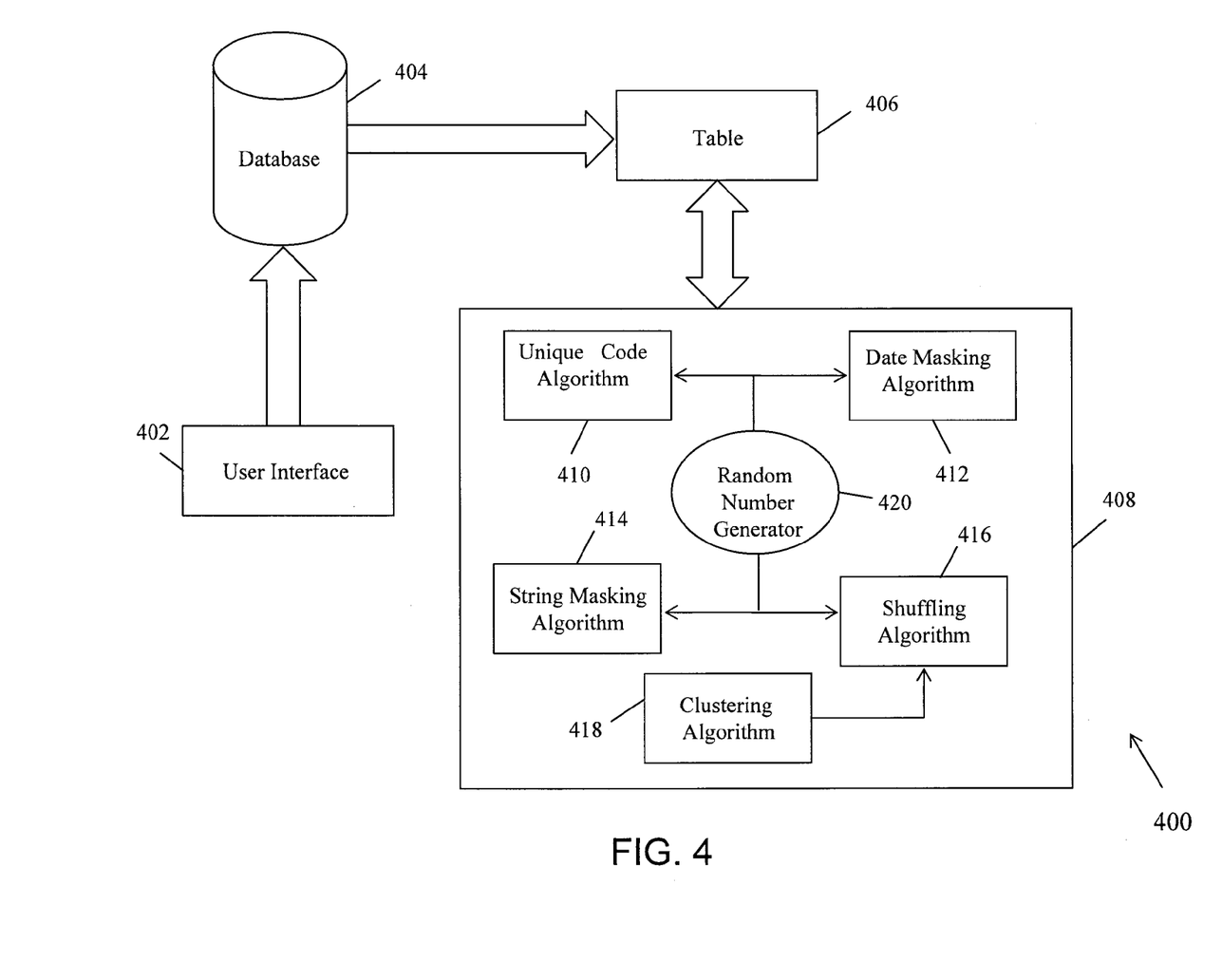

FIGS. 3 and 4 illustrate a system for implementing logical data masking, in accordance with an embodiment of the present invention. FIG. 3 illustrates clients 302, 304, 306 and 308 in communication with a server 310. The server 310 comprises software modules for implementing logical data masking. The clients 302, 304, 306 and 308 provide inputs to the server 310 defining parameters for implementing data masking algorithms. In an example, inputs provided by a user include level of data masking to be implemented, attributes to be masked, type of string masking algorithm to be implemented for masking string data etc. Further, examples of attributes to be masked include one or more columns of entries in a database table. FIG. 4 illustrates software modules in operation to implement logical data masking. Once user inputs parameters for data masking through a user interface 402, data is stored in a database 404. In various embodiments of the present invention, the user may provide inputs regarding type of masking to be employed for entries. The user may specify distinct type of masking to be employed for distinct columns of the database. For example, the user may specify a rank-based shuffling algorithm to be employed for entries in the columns "Name" and "Address" and a unique code masking algorithm to be employed for entries in the column "Employee Code". Information about type of data masking to be employed along with entries to be masked is then directed to a Table 406 from the Database 404. Thereafter, this data is provided to an analytical engine 408 to execute the process of data masking. The analytical engine 408 is configured to host data masking algorithms for masking data. In an embodiment of the present invention, the analytical engine 408 comprises the following modules comprising software code for implementing various algorithms: Unique Code Algorithm Module 410, Date Masking Algorithm Module 412, String Masking Algorithm Module 414, Shuffling Algorithm Module 416 and Clustering Algorithm Module 418. Further, the analytical engine 408 comprises a Random Number Generator 420. Based on inputs by a user, algorithm specific to data type of attribute is run to mask each data point i.e. each row in each column or attribute. The resulting masked data is stored as per requirements of the user.

In various embodiments of the present invention, the String Masking Algorithm Module 414 comprises software code for implementing both Rank-based shuffling algorithm and Position-based shuffling algorithm.

In various embodiments of the present invention, the Clustering Algorithm module 418 implements partition clustering algorithms as well as hierarchical clustering algorithms. For implementing clustering algorithms, the clustering algorithm module uses various distance measures such as Euclidean distance, Manhattan distance, Mahalanobis distance, Minkowski Distance and Chebyshev distance. In an exemplary embodiment of the present invention, the goodness of clustering is measured by measures such as entropy, sum of squares error, Akaike information criteria, Bayesian information criteria and the like. The Shuffling algorithm module 416 implements algorithms for shuffling within groups and shuffling across groups. As described earlier, for executing shuffling algorithms, date masking algorithms and unique code algorithms as well as for executing clustering algorithms, random number generation is needed. The Random Number Generator module 420 has various pseudo-random number generators including, but not limited to, random number generator such as linear congruential generator, lagged Fibonacci generator and generalized feedback shift registers to generate pseudo-random numbers.

As described with respect to FIGS. 3 and 4, the system of the present invention is implemented in a client-server architecture, wherein a user accesses a server through a network in order to specify preferences and parameters for implementing logical data masking. However, in an embodiment of the present invention, the system illustrated in FIG. 4 can be implemented as a stand-alone system.

The present invention may be implemented in numerous ways including as a system, a method, or a computer readable medium such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

What is claimed is:

1. A method for implementing logical data masking on data stored in a database, the method comprising:
   loading data to be masked from the database, wherein the loaded data comprises a table having one or more entries;
   grouping columns within the table into at least a first group of columns and a second group of columns, such that data entries within the first group of columns share a first data type, and data entries within the second group of columns share a second data type;
   applying a first data masking algorithm to data entries within the first group of columns and a second data masking algorithm to data entries within the second group of columns, wherein the first data masking algorithm and the second data masking algorithm are mutually distinct;

wherein applying the first data masking algorithm to data entries within the first group of columns comprises;

determining that data entries within the first group of columns are of a numerical data type; and responsive to determining that data entries within the first group of columns are of a numerical data type:

grouping individual rows of data entries within the first group of columns into at least a first group of rows and a second group of rows, wherein an individual row is grouped within the first group of rows and a second group of rows, wherein an individual row is grouped within the first group of rows based on a determination that numerical data within said individual row is quantitatively similar to numerical data within other rows within the first group of rows;

receiving user input selecting a first level of data masking; and responsive to the received user input selecting the first level of data masking:

(i) randomly swapping at least a first row data entry with a second row data entry within a first column of the first group of rows; and (ii) randomly swapping at least a first row data entry within a second column of the first group of rows, with a second row data entry within a corresponding column of the second group of rows.

2. The method of claim 1, further comprising executing a string masking algorithm for masking alphabetical data, wherein the string masking algorithms includes rank-based shuffling and position-based shuffling.

3. The method of claim 1, wherein grouping individual rows of data entries into the first group of rows and the second group of rows is based on at least one of hierarchical clustering algorithm, partition clustering algorithm and density-based clustering algorithm.

4. The method of claim 1, wherein grouping individual rows of data entries into the first group of rows and the second group of rows is implemented by determining similarity of entries to be grouped together by measuring at least one of Euclidean distance, Manhattan distance, Maximum Norm, Mahalanobis distance and Hamming distance.

5. The method of claim 1, comprising receiving user input selecting a second level of data masking; and responding to received user input selecting the second level of data masking by randomly swapping a first row of data entries with a second row of data entries within the first group of rows.

6. The method of claim 5, wherein the second level of data masking represents a lower level of data masking than the first level of data masking.

7. The method of claim 1, further comprising:

executing a unique code masking algorithm for masking data comprising unique codes, and executing a date masking algorithm for masking data comprising dates.

8. A system for implementing logical data masking on data entries stored in a database, the system comprising:

a processor;

a database for storing data entries;

a user interface configured to facilitate provision of one or more inputs by a user, wherein the one or more inputs specify:

a first level of data masking to be applied to data retrieved from the database;

a first data masking algorithm applicable to a first data type; and a second data masking algorithm applicable to a second data type; and an analytical engine operationally connected to the database and configured to host one or more data masking algorithm modules comprising software code for masking data entries, wherein the software code for masking data entries is executed based on the one or more inputs provided by the user, and wherein the analytical engine is configured to:

retrieve data to be masked from the database, wherein the loaded data comprises a table having one or more entries;

grouping columns within the table into at least a first group of columns and a second group of columns, such that data entries within the first group of columns share a first data type, and data entries within columns of the second group of columns share a second data type; and applying a first data masking algorithm to data entries within the first group of columns and a second data masking algorithm to data entries within the second group of columns, wherein the first data masking algorithm and the second data masking algorithm are mutually distinct;

wherein applying the first data masking algorithm to data entries within the first group of columns comprises:

determining that data entries within the first group of columns are of a numerical data type; and responsive to determining that data entries within the first group of columns are of a numerical data type:

grouping individual rows of data entries within the first group of columns into at least a first group of rows and a second group of rows, wherein an individual row is grouped within the first group of rows based on a determination that numerical data within said individual row is quantitatively similar to numerical data within other rows within the first group of rows;

responsive to the received user input specifying the first level of data masking:

(i) randomly swapping at least a first row data entry with a second row data entry within a first column of the first group of rows; and (ii) randomly swapping at least a first row data entry within a second column of the first group of rows, with a second row data entry within a corresponding column of the second group of rows.

9. The system of claim 8, wherein the one or more data masking algorithm modules are configured to execute at least one of shuffling algorithms, string masking algorithms, date masking algorithm, unique code masking algorithm and clustering algorithms.

10. The system of claim 9, wherein the analytical engine further comprises a random number generator module configured to generate random numbers in order to facilitate execution of the one or more data masking algorithms.

11. The system of claim 10, wherein the random number generator module comprises at least one of linear congruential generator, lagged Fibonacci generator and one or more generalized feedback shift registers.

12. The system of claim 8, wherein the analytical engine is configured to execute a string masking algorithm for masking alphabetical data, wherein the string masking algorithm includes rank-based shuffling and position-based shuffling.

13. The system of claim 8, wherein the one or more user inputs further specify a second level of data masking and wherein the analytical engine responds to the received user input selecting the second level of data masking by randomly swapping a first row of data entries with a second row of data entries within the first group of rows.

14. The system of claim 13, wherein the second level of data masking represents a lower level of data masking than the first level of data masking.

* * * * *